Sept. 5, 1939.  H. ANGEL ET AL  2,172,269
TELEGRAPH TAPE TRANSMITTER
Filed Nov. 15, 1935  2 Sheets-Sheet 1
FIG. 1
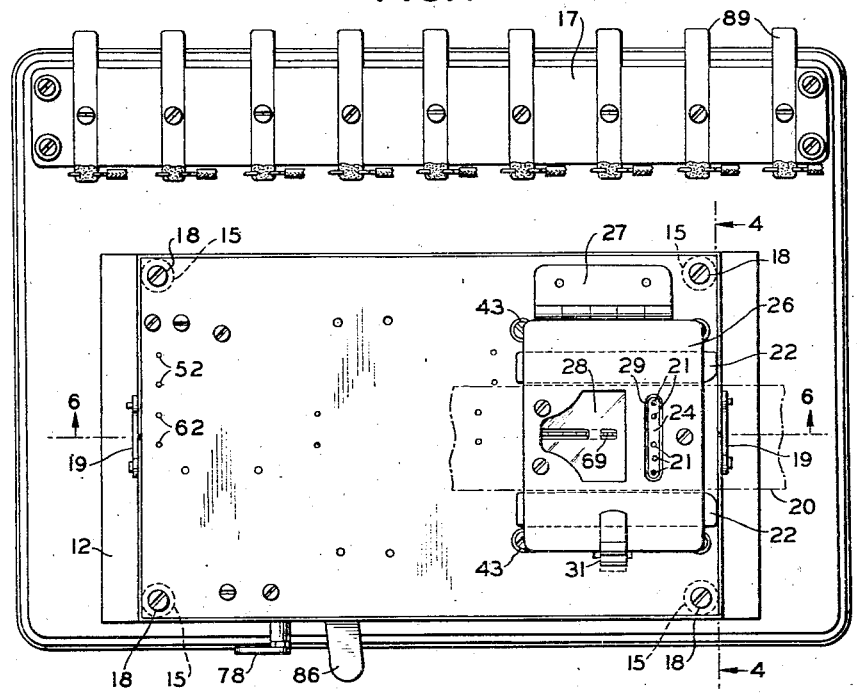
FIG. 2
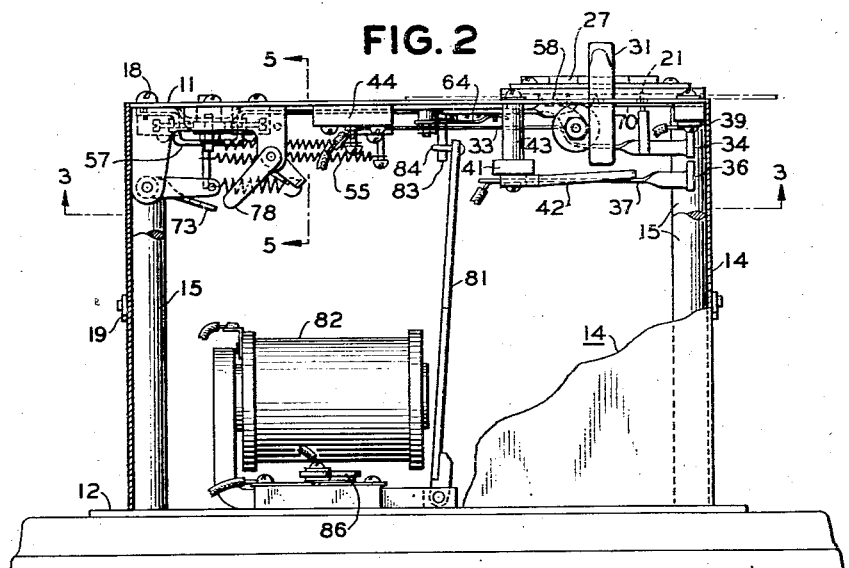
FIG. 4
INVENTORS
H. ANGEL
J. W. ROBINSON
BY Eugene C. Brown
ATTORNEY Sept. 5, 1939.  H. ANGEL ET AL  2,172,269
TELEGRAPH TAPE TRANSMITTER
Filed Nov. 15, 1935  2 Sheets-Sheet 2
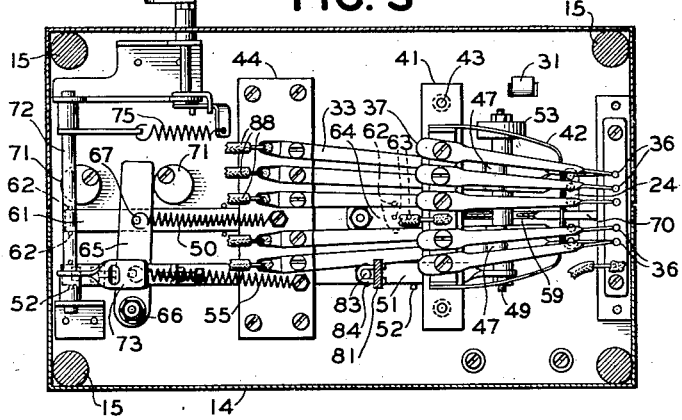
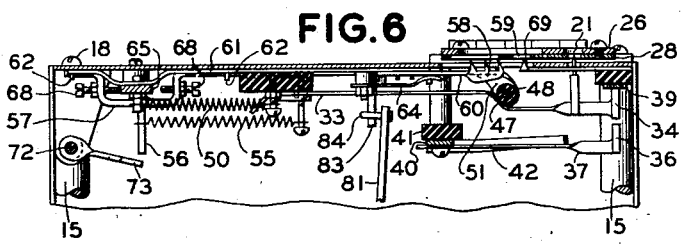
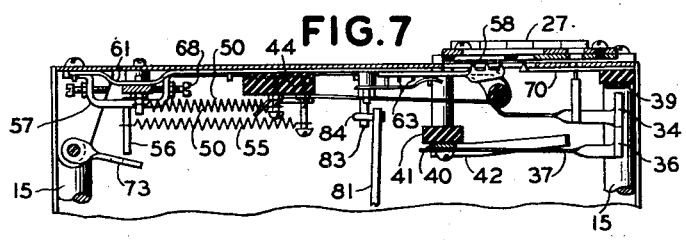
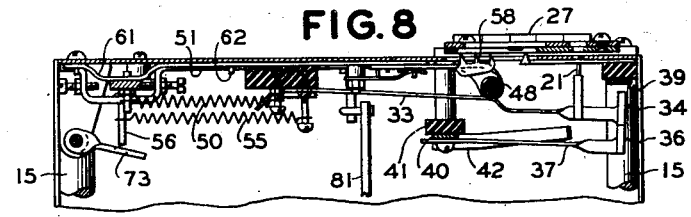
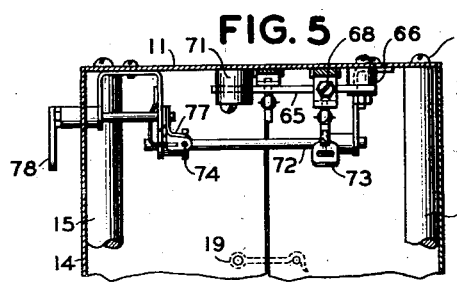
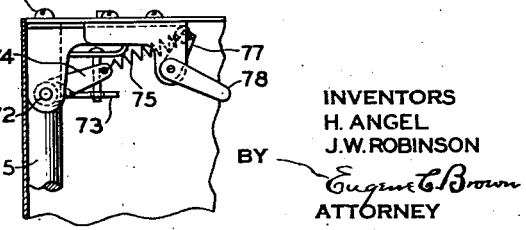
INVENTORS
H. ANGEL
J.W. ROBINSON
BY Eugene C. Brown
ATTORNEY Patented Sept. 5, 1939

2,172,269

UNITED STATES PATENT OFFICE 2,172,269

TELEGRAPH TAPE TRANSMITTER

Herbert Angel, Brooklyn, and James W. Robinson, Far Rockaway, N. Y., assignors to The Western Union Telegraph Company, New York, N. Y., a corporation of New York Application November 15, 1935, Serial No. 50,018

16 Claims. (Cl. 178—17)

The present invention relates to tape transmitters for use in telegraph systems and more particularly to improvements in the electrical contacts and operating mechanism thereof.

An object of the present invention is to provide an improved tape transmitter of compact construction in which the principal parts of the operating mechanism are carried by a single suitably mounted support.

A further object is to combine the tape controlled contacts with the tape feeler devices to thereby aid in providing a simplified contact structure.

Another object of the present invention is to provide in a telegraph tape transmitter a simplified operating connection between the signal responsive magnet or other signal controlled device and the tape stepping and contact operating mechanism.

In accordance with the present invention, the tape is advanced or stepped longitudinally and is retained securely in position between stepping movements by a novel and simple arrangement thereby eliminating the necessity for a sprocket wheel and its somewhat complicated driving mechanism. A still further object, therefore, is to provide a novel tape advancing or stepping means.

A still further object is to provide a telegraph tape transmitter in which like elements of the contact mechanism are associated together as a unit.

The foregoing and other more specific objects will appear from the following description of an illustrative embodiment. In order that the invention may be more fully understood, reference will be had to the accompanying drawings in which:

Fig. 1 is a top plan view of a tape transmitter embodying the present invention;

Fig. 2 is a view in side elevation of the transmitter disclosed in Fig. 1 with the casing and certain parts thereof broken away for the sake of clearness of illustration;

Fig. 3 is a horizontal section taken on line 3—3 of Fig. 2 as viewed in the direction of the arrows;

Fig. 4 is a fragmentary sectional view taken on line 4—4 of Fig. 1 of the top portion of the transmitter as viewed in the direction of the arrows;

Fig. 5 is a fragmentary vertical section taken on line 5—5 of Fig. 2;

Figs. 6, 7 and 8 are fragmentary views in vertical section taken on line 6—6 of Fig. 1 and illustrate the mode of operation of the principal parts of the illustrative device; and Fig. 9 is a fragmentary view in side elevation illustrating the operation of a part of the mechanism.

Referring for the present to Figs. 1 and 2, the transmitter will be seen to comprise a top plate 11, a mounting base plate 12 and a suitable housing or casing 14. The plate 11 which serves as a support for the principal parts of the operating mechanism later to be described in detail, is mounted upon and spaced the desired distance from the base plate 12 by four posts 15, the latter being suitably secured to the base. The plate 12 is adapted to be secured on a suitable base 16 which also carries the terminal strip 17. It will be understood that the posts 15 may be fastened directly to the base 16 in which case the plate 12 may be omitted. In order that the top plate 11 may be readily detached from the base, it is apertured to receive screws 18, which are engaged in internal threads at the tops of the posts 15. The case or cover previously mentioned is, in the embodiment shown, made up of two parts preferably constructed of sheet metal. These housing parts are fitted together from each side of the transmitter and are secured in position by catch devices 19 (Fig. 5). From the parts so far described, it will be seen that access may be had to the operating mechanism of the transmitter by removing the housing 14 and the principal operating parts thereof are made readily accessible for any purpose by removing the screws 18.

The top plate 11 is adapted for passage over it of a perforated tape 20, this tape being, in practice, perforated transversely according to the code characters or signals to be transmitted. A set of transversely aligned and insulated feeler pins 21 cooperate with the perforations in a manner to be described. The particular code known as the five-unit code, for which the transmitter shown is intended to be used, consists of five transmitted impulses of which some may be positive and others negative. The transmitter shown, therefore, comprises five sets of contacts, each set being arranged to produce current reversals, but it is to be understood that the number of contacts may be varied and the transmitter may be adapted for merely making and breaking the circuit. The mounting and arrangement of the contacts and tape feeler pins is an important feature of the invention and will be later described in full detail.

To guide the tape 19 in its longitudinal movement, two guide pieces 22 are secured to the top plate and are spaced apart by a distance but slightly greater than the width of the tape. The top plate is provided with an elongated aperture 24 which surrounds the feelers 21 and a plate 26 is hinged at 27 so that it overlies the tape when the latter is placed between the guide pieces 22 in preparation for operation of the transmitter. A tape guide member 28 is secured to the hinged plate so that it extends between the guides 22 and serves to keep the tape in proper position with respect to the top plate. The member 28 may be made of glass or like transparent substance but it may be opaque and of any suitable material, and it is apertured as indicated at 29 so that in the closed position of the plate 26, the apertures 24 and 29 are in register. A suitable latch 31 is provided to hold the plate 26 and hence the tape guide member in operative position.

Each of the set of contacts above mentioned comprises a resilient contact arm 33 having an elongated contact 34 secured at its end, and in one direction of movement of the arm 33, the contact 34 is adapted to engage a contact 36 which is supported on a resilient arm 37. The contacts 34 are also adapted to move into engagement with a fixed contact or marking bus bar 39 which is detachably secured to and insulated from the top plate 11. The five resilient contact arms 37 are electrically strapped together by a conducting piece 40 and are mounted on a block 41 so as to comprise an individual assembly unit which is supported from the top plate 11 by screw means and spacing pillars 43. The ends of the arms 37 carrying the contacts 36 are relatively closely spaced and the opposite ends of these arms are more widely spaced apart on the block 41. This arrangement is facilitated by forming the arms with a ninety degree twist at their ends adjacent the contacts so that these ends lie in parallel planes. The tops of the contacts 36 are maintained at a common level by means of a strip 42 secured to the block 41, the edge of said strip serving as a stop by engaging the arms 37.

The resilient arms 33 are likewise mounted on a block 44 so as to comprise an individual assembly unit which is detachably connected to the top plate by screw means.

All of the arms 33 are similar in construction and therefore one only will be described in detail. As shown in Fig. 2 and as previously stated, each arm 33 is provided with an elongated contact 34 adjacent its end and one of the five feeler pins 21 is secured to the arm. In order that the contacts 34 may lie closely adjacent each other and in alignment with the contacts 36, the end of each arm 33 is twisted through an angle of ninety degrees. Each contact arm 33 is provided with an inclined or stepped cam portion 47, which is adapted to cooperate with a cam roller 48, the latter being rotatably mounted upon a pin 49. The pin 49 is secured to the end of a reciprocating bar 51. The bar 51 is mounted for reciprocation upon the top plate 11 in a channel formed in the block 44. Suitable guides indicated by the reference characters 52 are provided to constrain movement of the bar in its proper longitudinal path. A roller 53 resting against and rolling on the plate 11 is journalled at the end of the pin 49 and it will be seen that as the bar 51 is reciprocated toward the left, as viewed in Fig. 8, all of the arms 33 will be cammed downwardly by reason of engagement with the roller 48 against the inclined cam portion 47 of each arm. The bar 51 is biased to its inoperative or normal position by means of a spring 55 secured at one end to a pin on the plate 11, the free end of the spring being engaged over a pin 56 secured to an arched portion 57 of the bar. The tape is advanced automatically by means of teeth 58 which project upwardly through an elongated aperture 59 and the teeth are formed adjacent the end of an arm 60. One face of each of the teeth 58 is vertical and the other inclined. The inclined faces of the teeth cause them to be released from engagement with the tape when the arm 60 moves in one direction. The arm 60 is resiliently carried at the end of a reciprocating bar 61 which is guided by a notch in the block 44 and by suitably positioned guide pins 62 secured to the top plate 11. A spring 50 serves to bias the bar 61 for movement toward the right. Relative movement between the bar and the arm is provided by mounting the arm on a pair of spaced guide pins 63 secured to the bar, the arm being apertured to receive the pins. A spring 64 presses the teeth 58 upwardly through the longitudinal tape advancing perforations in the tape.

Reciprocating movement is imparted to the tape advancing bar 61 by means of a lever arm 65 pivoted to the top plate 11 at the point 66 and a pivotal connection is provided by the pin 67 between this pivoted arm and the bar 61. Adjustable stop screws 68 provide for a lost motion connection between the reciprocating bar 51 and the pivoted arm 65 so that the bar 51 may be moved to depress the feeler pins 21 before the teeth 58 are moved longitudinally to space the tape. Slippage or unwanted movement of the tape is prevented by means of a tooth 69 at the end of a resilient arm 70, the latter being secured beneath the block which supports the bus bar 39. Swinging movement of the pivoted arm 63 may be adjustably limited by eccentric stops 71.

In order to provide for locking the transmitter with the feelers 21 depressed and the contacts 34 against the spacing contacts, a locking mechanism is provided which is illustrated in detail in its operated position in Fig. 9 of the drawings. A rock shaft 72 is rotatably mounted in suitable brackets secured to the top plate and carries an apertured arm 73 which is adapted to engage over the previously mentioned pin 56 when the bar 61 is moved to its left hand position. At this time it will be noted that the feeler pins 21 are withdrawn beneath the top surface of the plate 11 and therefore are disengaged from the tape and the several contacts 34 are in engagement with the spacing contacts 36. The shaft 72 is rocked by means of an over center spring arrangement comprising an arm 74 and an extensible spring 75. The spring 75 is engaged at one end over the arm 74 and at its other end it is connected to a bell crank arm 77. The bell crank arm and the rock shaft 72 to which it is secured may be conveniently operated by means of a thumb lever 78 which is exposed outside of the casing 14, a slot being provided in the casing to facilitate removal of the latter over the thumb piece 78.

The principal operating parts of the transmitter just described are operated by the armature 81 of a magnet 82. For the purpose of operatively connecting the pivoted arm 78 to the reciprocating bar 51, a pin 83 is provided on the bar 51 and this pin is engaged by a loop 84 secured adjacent the top of the armature 81. The connection just described provides for ready detachment of the top plate without the necessity for disconnecting parts interconnecting the armature and the transmitter operating mechanism.

The operation of the transmitter is as follows:

Assuming the parts to be in the position shown in Figs. 2 and 6, with the magnet 82 deenergized, when the magnet is energized, the armature 81 will swing to the left, the bar 51 will be reciprocated toward the left and the first part of its movement will cause the roller 48 to depress the contacts 34. This initial step of operation illustrated by Fig. 7 will withdraw the pins 21 from the tape. As the bar 51 is moved further toward the left, the right hand stop pin 68 will engage and cause the pivoted arm 65 to swing toward the left, reciprocating the bar 61 and causing the tape to be advanced a predetermined distance by means of the claws 58 which are engaged in spaced holes in the tape. It should be noted that the bar 61 is moved rapidly upon engagement of the screw 68 with the lever 65 inasmuch as the distance from the pivot point 66 to the point 67 is greater than the distance from the point 66 to the point of engagement of the stop screw 68. During movement of the tape, the tooth 69 is cammed downwardly and permits the tape to move. Fig. 8 illustrates the position of the parts when the bar 51 has completed its movement to the left.

Upon deenergization of the magnet 82, the spring 50 will first return the bar 61 toward the right, the resilient connection 63—64 permitting the teeth 58 to disengage from the tape and as the lever 65 progresses toward the right, it will be stopped by one of the stops 71. The bar 51 will continue to move toward the right under the influence of spring 55 which will permit the contact arms 33 and contacts 34 to rise. Depending on the code selection which has been punched in the tape, certain of the contact arms 33 may be retained in their downward or spacing position. For example, if a group of aligned holes occurs in the tape, all five feeler pins 21 will penetrate the tape, permitting the contacts 34 to rise against the marking bus bar 39. If, however, the tape is blank, none of the feeler pins can penetrate the tape and all of the contacts 34 will be pressed against the spacing contacts 36.

A circuit breaking switch 86 is provided for interrupting the circuit of the actuating magnet 82 when desired. The contact tongues 33 are connected by means of leads 88 to five of the terminals 89 on the terminal board 17. Other electrical connections to this terminal board are provided in accordance with the class of service for which the automatic transmitter is to be used.

It will be seen from the foregoing description that the transmitter embodying the present invention is compact and is constructed of adjustable parts which may be readily manufactured since the principal operating portions of the transmitter consist for the most part of elements which may be readily formed from strip or sheet material. Also, it will be noted that the several portions of the contact structure may be made up as separate units adapted for quick assembly to the top plate 11. The contacts and other parts are light and hence a transmitter embodying this invention may be operated at high speeds.

The invention may be embodied in other forms and various changes and modifications will occur in the construction of the transmitter within the scope of the invention. Therefore, we do not desire to be limited to the exact details shown and described herein.

What we claim is:

1. In a telegraph transmitter, a main supporting member, means on said supporting member for retaining a perforated strip in position while permitting it to be advanced longitudinally, mechanism carried by said member and operative to effect a step-by-step advance of said strip, a plurality of relatively fixed contacts secured to said supporting member, and combined movable contacts and feeler pins cooperating with said first named contacts and connected to said supporting member, said mechanism including means for operating said movable contacts and feeler pins.

2. In a telegraph transmitter, a base and a removable top plate supported above said base, a guide frame hinged to said top plate and adapted in one position thereof to retain a perforated strip in position while permitting it to be advanced longitudinally, mechanism carried by said top plate and operative to effect a step-by-step advance of said strip, a plurality of relatively fixed contacts secured to said top plate, combined movable contacts and feeler pins cooperating with said first named contacts and connected to said top plate, said mechanism including means for operating said movable contacts and feeler pins, and signal operated means supported solely on said base to cause operation of said mechanism.

3. In a telegraph transmitter, a base member, a main supporting member and means to secure said members together in spaced relationship, means on said supporting member for retaining a perforated strip in position while permitting it to be advanced longitudinally, a reciprocating member having tape engaging means operative to effect a step-by-step advance of said strip and mechanisms for reciprocating said last named member, a plurality of sets of contact devices secured to said supporting member, each set comprising a movable contact and a feeler pin to cooperate with said strip, said mechanism including means to operate said movable contacts and feeler pins, a signal controlled device carried by said base and an operative connection between said mechanism and said signal controlled device.

4. In a telegraph transmitter, a base member, a main supporting member and means to secure said members together in spaced relationship, means on said supporting member for retaining a perforated strip in position while permitting it to be advanced longitudinally, mechanism carried by said member and operative to effect a step-by-step advance of said strip, a plurality of sets of contact devices secured to said supporting member, each set comprising a movable contact and a feeler pin to cooperate with said strip, said mechanism including means to operate said movable contacts and feeler pins, a controlling device associated with said transmitter and an operative connection between said mechanism and said controlling device.

5. In a tape transmitter comprising a group of contacts, a series of tape feeler pins positioned to engage perforations in a tape, a carrier for each pin in the form of a resilient arm, and a contact carried by each of said arms for cooperation with one of said first-named contacts, the position of said contacts being controlled by the pin individual thereto.

6. In a tape transmitter comprising a group of contacts, a series of tape feeler pins positioned to engage perforations in a tape, a carrier for each pin in the form of a resilient arm, a contact carried by each of said arms for cooperation with one of said first-named contacts, the position of said contacts being controlled by the pin individual thereto, and a reciprocating member operatively associated with said resilient arms to simultaneously retract the pins from engagement with perforations in the tape.

7. In a tape transmitter comprising a series of tape feeler pins, means adapted to move said pins through successive perforations in a tape, means including a movable carrier for each pin tending to press said pins against the tape, a series of stationary contacts and a series of movable contacts, one for each pin for cooperation with said stationary contacts, said movable contacts being carried by said movable pin carriers whereby the position of each contact is determined by the pin associated therewith on its carrier.

8. In a tape transmitter comprising a series of tape feeler pins adapted to move through perforations in a tape, a flat carrying spring for each pin biased to press said pins against the tape, a series of stationary contacts and a series of movable contacts, one for each pin for cooperation with one of said stationary contacts, said movable contacts being carried by said springs whereby the position of each contact is determined by the pin associated therewith on the spring.

9. In an automatic impulse transmitter, a group of contacts, contact means opposite said contacts, a group of resilient contact carrying arms, each arm having a contact thereon for cooperation with one of said first named contacts and said contact means, a tape feeler pin on each of said resilient arms to cooperate with a tape to control the position of said arms, and means whereby said first named group of contacts and said group of resilient arms each constitute a separate assembly capable of being handled as a unit.

10. In an automatic impulse transmitter, a group of resilient arms and a contact on each arm, contact means opposite said contacts, another group of resilient contact carrying arms, each arm in said last named group having a contact thereon for cooperation with one of said first named contacts and said contact means, a tape feeler pin on each of said second named resilient arms to cooperate with a tape to control the position of said arms, and means whereby said first and second named groups of resilient arms each constitute a separate assembly capable of being handled as a unit.

11. In an intermittently operating tape advancing mechanism for a telegraphic tape transmitter, a bar supported for longitudinal reciprocation, a member resiliently supported on said bar and having teeth formed to engage a row of longitudinal perforations in a tape in one direction of movement of the bar and to be released from engagement in the other direction of movement of the bar, a plurality of sets of contact devices, each set including opposed contacts and movable contacts, means for operating said movable contacts including feeler pins adapted to engage transverse perforations in the tape, and means operatively connected to said contact operating means for reciprocating said bar in timed relation.

12. The combination defined in claim 11 wherein said last named means comprises a lever oscillating about a fixed pivot and pivotally connected adjacent one end to said bar and having a lost motion connection with said contact operating means.

13. In an intermittently operating tape advancing mechanism for a telegraphic tape transmitter, a bar supported for longitudinal reciprocation, means on said bar having teeth formed to engage a row of longitudinal perforations in a tape in one direction of movement of the bar and to be released from engagement in the other direction of movement of the bar, a plurality of sets of contact devices, each set including opposed contacts and movable contacts, a second bar supported for longitudinal reciprocation and a contact operating member thereon, members supporting said movable contacts and including cam portions adapted to be engaged by said contact operating member, a lever oscillating about a fixed pivot and pivotally connected adjacent one end to said first named bar, and a lost motion connection between said second named bar and said lever.

14. A telegraph transmitter comprising in combination tape feeding means, a series of feelers adapted to move through perforations of a tape, means tending to move said feelers toward and through the tape, restoring means comprising a reciprocable bar and a cam roller for withdrawing from engagement with the tape, feelers already in engagement therewith, contact means, one for each feeler, operated by its associated feeler to a position for transmitting spacing current, and a locking member for said bar adapted to lock the same in position with said feelers withdrawn from the tape and said contact means in spacing current transmitting position.

15. Telegraph transmitting apparatus for feeding a punched flexible strip comprising a supporting member in the form of a substantially flat plate, tape guiding and advancing means, feeler pins and contacts supported solely by said plate, a mounting base and supports interconnecting said plate and said base.

16. The combination of claim 15 wherein said plate is sheet metal.

HERBERT ANGEL.
JAMES W. ROBINSON.